(12) United States Patent
Kawamata et al.

(10) Patent No.: US 9,451,213 B2
(45) Date of Patent: Sep. 20, 2016

(54) DISTANCE MEASURING APPARATUS AND DISTANCE MEASURING METHOD

(75) Inventors: Shinya Kawamata, Gotemba (JP); Ryuji Funayama, Yokohama (JP); Shin Satori, Sapporo (JP); Yoshihide Aoyanagi, Sapporo (JP); Tadayoshi Komatsuda, Sapporo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 319 days.

(21) Appl. No.: 13/498,659

(22) PCT Filed: Jul. 23, 2010

(86) PCT No.: PCT/JP2010/062404
§ 371 (c)(1),
(2), (4) Date: Mar. 28, 2012

(87) PCT Pub. No.: WO2012/011187
PCT Pub. Date: Jan. 26, 2012

(65) Prior Publication Data
US 2013/0271597 A1    Oct. 17, 2013

(51) Int. Cl.
*H04N 9/73* (2006.01)
*H04N 9/64* (2006.01)
(Continued)

(52) U.S. Cl.
CPC *H04N 7/18* (2013.01); *G01C 3/08* (2013.01); *G01S 11/12* (2013.01); *G02B 27/0025* (2013.01)

(58) Field of Classification Search
None
See application file for complete search history.

(56) References Cited

U.S. PATENT DOCUMENTS 5,165,063 A * 11/1992 Strater et al. ............... 356/4.01
5,629,799 A * 5/1997 Maruyama ............... G02B 3/04
359/565

(Continued)

FOREIGN PATENT DOCUMENTS

JP    3-267708    11/1991
JP    11-264933    9/1999
(Continued)

OTHER PUBLICATIONS

International Search Report in International Application No. PCT/JP2010/062404; Mailing Date: Sep. 28, 2010.
(Continued)

*Primary Examiner* — Joseph Ustaris
*Assistant Examiner* — Rebecca Volentine
(74) *Attorney, Agent, or Firm* — Finnegan, Henderson, Farabow, Garrett & Dunner, LLP (57) ABSTRACT

A distance measuring apparatus (11) optically detects a measuring target, thereby measuring an object distance, which is the distance to the measuring target. The orientation of an optical axis of a lens is set to be different from an advancing direction of light incident from the measuring target. The lens is configured to form an image from the incident light, thereby obtaining an image of the measuring target. The distance measuring apparatus includes an imaging relative quantity calculating means (31, 32) for obtaining an imaging position indicative of a position of the image with respect to the lens for each of a plurality of wavelengths possessed by the incident light, thereby calculating an imaging relative quantity, which is a quantity indicative of a relative relationship between the imaging positions; storage means (17) for storing correlation information (18), which is information determined by a chromatic aberration characteristic of the lens and the orientation of the optical axis in order to indicate a correlation between the imaging relative quantity and the object distance; and distance calculating means (33) for calculating the object distance by checking the imaging relative quantity against the correlation information (18).

10 Claims, 5 Drawing Sheets (51) Int. Cl.
*G06K 9/00* (2006.01)
*G01C 3/08* (2006.01)
*H04N 7/18* (2006.01)
*G02B 27/00* (2006.01)
*G01S 11/12* (2006.01)

(56) References Cited

U.S. PATENT DOCUMENTS

| | | | |
|---|---|---|---|
| 5,785,651 A * | 7/1998 | Kuhn et al. | 600/310 |
| 6,185,036 B1 | 2/2001 | Tanaami | |
| 6,570,827 B1 * | 5/2003 | Yamamoto | G11B 7/1378 |
| | | | 359/796 |
| 2003/0030780 A1 * | 2/2003 | Dieckmann et al. | 355/67 |
| 2005/0045725 A1 * | 3/2005 | Gurevich et al. | 235/454 |
| 2005/0286140 A1 * | 12/2005 | Tomioka | 359/689 |
| 2006/0066957 A1 * | 3/2006 | Fukui | 359/689 |
| 2006/0268115 A1 | 11/2006 | Eggers et al. | |
| 2008/0137061 A1 * | 6/2008 | Rush | 356/4.04 |
| 2008/0212168 A1 * | 9/2008 | Olmstead et al. | 359/355 |
| 2008/0225405 A1 * | 9/2008 | Kuroda | G02B 15/173 |
| | | | 359/687 |
| 2008/0239316 A1 | 10/2008 | Gharib et al. | |
| 2008/0278804 A1 | 11/2008 | Gharib et al. | |
| 2008/0291447 A1 * | 11/2008 | Vakrat | G02B 27/0025 |
| | | | 356/364 |
| 2009/0179824 A1 * | 7/2009 | Tsujimoto et al. | 345/7 |
| 2009/0207271 A1 * | 8/2009 | Utsugi | H04N 9/045 |
| | | | 348/223.1 |
| 2010/0097693 A1 * | 4/2010 | Koga | 359/385 |
| 2010/0165175 A1 * | 7/2010 | Deng et al. | 348/345 |
| 2010/0283989 A1 * | 11/2010 | Sesko | 356/4.04 |
| 2012/0156636 A1 | 6/2012 | Stock et al. | |

FOREIGN PATENT DOCUMENTS

| | | |
|---|---|---|
| JP | 2002-27501 | 1/2002 |
| JP | 2007-17401 | 1/2007 |
| JP | 2007-71685 | 3/2007 |
| JP | 2007-506074 | 3/2007 |
| JP | 2009-41928 | 2/2009 |
| JP | 2010-517038 | 5/2010 |
| WO | WO 03/036229 A1 | 5/2003 |
| WO | WO 2005/038393 A1 | 4/2005 |
| WO | WO 2008/091639 A2 | 7/2008 |
| WO | WO 2009/037949 A1 | 3/2009 |

OTHER PUBLICATIONS

Office Action for U.S. Appl. No. 13/574,460 dated Jul. 1, 2015.

* cited by examiner

DISTANCE MEASURING APPARATUS AND DISTANCE MEASURING METHOD

CROSS-REFERENCE TO RELATED APPLICATIONS

This application is a national phase application of International Application No. PCT/JP2010/062404, filed Jul. 23, 2010, the contents of which are incorporated herein by reference.

TECHNICAL FIELD

The present invention relates to a distance measuring apparatus for measuring distance to a measuring target present in the surrounding environment, particularly, a measuring target present in a traffic environment based on optical detection of the measuring target, and to a distance measuring method that is suitably for use in the distance measuring apparatus.

BACKGROUND ART

Conventionally, a distance measuring apparatus has been put into practical use to measure the distance to a measuring target. The apparatus measures the distance to a measuring target based on optical detection of light selected from visible and invisible light. The distance measuring apparatus is provided on a vehicle, which is a movable body, for example, in order to measure the distance (relative distance) between another vehicle, which is a measuring target or the like, and a host vehicle (the distance measuring apparatus itself). The distance measuring apparatus offers information about the distance thus measured as driving support information to a driving support apparatus or the like, for example, for supporting avoidance of a collision with other vehicles.

There are known distance measuring apparatuses for optically measuring distance to a measuring target, which are described in Patent Document 1 and Patent Document 2.

The distance measuring apparatus described in Patent Document 1 has a light source for projecting light formed in a predetermined pattern having different wavelengths from each other onto a measuring target and picks up an image of a pattern of the light projected onto the measuring target in a different direction from the optical axis of the light source. The distance measuring apparatus measures the distance to the measuring target based on a change in the pattern of the projected light and the pattern of the light subjected to the image pickup. Thus, the distance measuring apparatus described in Patent Document 1 needs to have a light source for projecting onto the measuring target, light having sufficient intensity for enabling the image pickup. For this reason, when the distance measuring apparatus described in Patent Document 1 is provided on a vehicle, the light source is to project a light pattern having such an intensity as to enable the image pickup onto a measuring target, which is placed apart from the host vehicle by several tens to several hundreds meters in some cases. In other words, the quantity of the energy consumed by the light source cannot be disregarded.

On the other hand, Patent Document 2 discloses a distance measuring apparatus using no light source. The distance measuring apparatus includes two cameras, that is, a camera that is sensitive to a visible spectral range and a camera that is sensitive to an infrared spectral range. The cameras are disposed at a predetermined interval therebetween. The distance measuring apparatus measures the distance to an identical measuring target by applying a triangulation method to an image of the measuring target, which is picked up by the respective cameras. Thus, the distance measuring apparatus described in Patent Document 2 does not need a special light source. For this reason, the energy consumption is admittedly low. In order to maintain high precision in the measurement of the distance, it is indispensable to accurately maintain the predetermined interval between the two cameras, which is the basis of the triangulation method.

PRIOR ART DOCUMENT

Patent Document

Patent Document 1: Japanese Laid-Open Patent Publication No. 2002-27501
Patent Document 2: Japanese National Phase Laid-Open Patent Publication No. 2007-506074

SUMMARY OF THE INVENTION

Problems that the Invention is to Solve

However, a distance measuring apparatus provided on a vehicle is influenced by vibration or distortion of a vehicle body, or the like. For this reason, it is not easy to maintain a predetermined interval between two cameras attached to the vehicle body with high precision. In a case in which the distance measuring apparatus is particularly provided on the vehicle, thus, there is room for further improvement in practice in respect of a simplification of the structure or the like.

In consideration of the actual circumstances, it is an objective of the present invention to provide a distance measuring apparatus capable of measuring a distance to a measuring target with a simple structure even if the distance measuring apparatus is provided on a vehicle or the like, and a distance measuring method that is suitably used in the distance measuring apparatus.

Means for Solving the Problems

To achieve the foregoing objective, the present invention provides a distance measuring apparatus for measuring distance to a measuring target by optically detecting the measuring target. The apparatus includes a lens, an imaging relative quantity calculating means, a storage means, and a distance calculating means. The lens has an optical axis in a different orientation from an advancing direction of light incident from the measuring target. The lens is configured to form an image from the incident light, thereby obtaining an image of the measuring target. The imaging relative quantity calculating means calculates an imaging relative quantity by obtaining an imaging position indicative of the position of the image with respect to the lens for each of a plurality of wavelengths possessed by the incident light. The imaging relative quantity is a quantity indicative of a relative relationship between the imaging positions. The storage means stores correlation information, which is information determined by a chromatic aberration characteristic of the lens and the orientation of the optical axis in order to indicate a correlation between the imaging relative quantity and the object distance. The distance calculating means calculates the object distance by checking the imaging relative quantity against the correlation information.

According to the structure, the lens having the optical axis in the different orientation from the advancing direction of the incident light is used so that the imaging positions for the respective wavelengths are different from each other. Consequently, the imaging relative quantities between the imaging positions are detected to be different from each other. In other words, the distance measuring apparatus can measure the distance to the measuring target based on the imaging relative quantities, which are different from each other. An ordinary lens has a refractive index that is varied for each wavelength of the light, that is, causes a chromatic aberration. For this reason, the imaging position is varied for each wavelength when an image of the light having the wavelengths is to be formed. In a case in which the optical axis of the lens is inclined with respect to the advancing direction of the incident light, accordingly, the lens refracts the incident light to be inclined toward the orientation of the optical axis of the lens. Thus, the light is refracted in a refractive index for each wavelength so that the imaging positions of the light are different from each other in a direction perpendicular to the advancing direction of the incident light (a horizontal direction or a vertical direction of the lens) for each wavelength. On the other hand, the object distance, which is the distance between the lens and the measuring target is varied with respect to a longitudinal direction of the lens so that an incident angle of the light on the lens is made different. For this reason, the object distance is varied so that an imaging position of light of a single wavelength is also changed. Consequently, the distance measuring apparatus can measure the distance to the measuring target based on a relative relationship between the imaging positions for the respective wavelengths.

Moreover, the imaging positions for the respective wavelengths are different from each other in the direction perpendicular to the advancing direction of the incident light. Therefore, the lights having the respective wavelengths are subjected to imaging without a hindrance to a detection over a common imaging plane which is generally provided to face the lens. Consequently, the imaging plane can detect the imaging positions for the respective wavelengths. In other words, it is rarely necessary to move the imaging plane in order to detect the imaging position. For this reason, an apparatus for moving the imaging plane is not required, for example. In other words, the imaging positions for the respective wavelengths can be detected with a simple structure.

In addition, it is possible to obtain the difference between the imaging positions for the respective wavelengths based on the chromatic aberration by detecting the imaging positions for the respective wavelengths through a common lens (optical system). Consequently, the distance can be measured by means of a single optical system, that is, a single camera. Therefore, as compared with a case in which a plurality of cameras is used, for example, the flexibility for the arrangement of the camera is increased. Furthermore, it is not necessary to maintain the arrangement position of the camera with high precision. Thus, it is possible to simplify the structure of the distance measuring apparatus.

Furthermore, an ordinary lens is subjected to chromatic aberration correction and is often configured in such a manner that the imaging distances for the respective wavelengths are coincident with each other for only light of the wavelengths to be acquired, for example, only light having a red wavelength, a blue wavelength and a green wavelength for an image. With the structure, however, light having a wavelength that is not subjected to chromatic aberration correction can be used for the measurement of the distance. Therefore, it increases the flexibility for the selection and design of the wavelength to be used in the distance measuring apparatus. In addition, it increases the flexibility for the selection and design of the optical system to be employed for the distance measuring apparatus.

The light preferably has two wavelengths, in which the imaging positions are different from each other, and the correlation information preferably constitutes map data, in which the imaging relative quantities are caused to correspond to the object distances, respectively.

According to the structure, the distance measuring apparatus can measure the distance to the measuring target based on the lights having two wavelengths in which the imaging positions through the lens are different from each other. If the light has two wavelengths or more, thus, the distance measuring apparatus can measure the distance to the measuring target. Therefore, it is possible to easily carry out the measurement of the distance.

The imaging relative quantity may be an imaging position difference, which is the difference between the imaging positions for the two wavelengths.

According to the structure, the imaging relative quantity is detected as the difference between the imaging positions of the light having two wavelengths. Therefore, it is possible to easily carry out a calculation related to the detection.

The imaging relative quantity may be an imaging position ratio, which is the ratio of the imaging positions for the two wavelengths.

According to the structure, similarly, it is possible to easily carry out the calculation related to the detection.

The optical axis of the lens may be inclined with respect to the advancing direction of the incident light.

According to the structure, if the optical axis of the lens is inclined with respect to the incident light, a difference is made between the imaging positions for the respective wavelengths. The distance measuring apparatus can measure the distance to the measuring target based on the difference between the imaging positions. For example, in the case of a general convex lens, if the lens is disposed with an inclination to the advancing direction of the incident light, the optical axis of the lens is inclined with respect to the advancing direction of the incident light. Thus, it is possible to simplify the arrangement or mode of the lens in the distance measuring apparatus or the characteristic of the lens.

A surface of the lens may be non-rotationally symmetrical with respect to the optical axis of the lens.

According to the structure, it is possible to incline the optical axis of the lens by forming the surface of the lens to be non-rotationally symmetrical with respect to the optical axis of the lens. By regulating the surface shape of the lens, accordingly, it is possible to incline the optical axis of the lens in order to meet a wavelength of an emitted light and distance to a measuring target. Therefore, it increases the flexibility of the selection and a design of the lens to be used in the distance measuring apparatus.

A refractive index of the lens may be non-rotationally symmetrical with respect to the optical axis of the lens.

According to the structure, it is possible to regulate the inclination of the optical axis of the lens by causing the refractive index of the lens to be non-rotationally symmetrical with respect to the optical axis. Accordingly, it is possible to incline the optical axis of the lens in order to meet the wavelength of the emitted light and the distance to the measuring target. Consequently, it also increases the flexibility of the selection and design of the lens to be used in the distance measuring apparatus.

The lens is preferably a part of a spectrum sensor for detecting light transmitted from the measuring target.

According to the structure, it is possible to detect light having a plurality of optional wavelengths by using the spectrum sensor. Therefore, it is possible to calculate a large number of imaging relative quantities based on the imaging positions of the images formed by the lights having the detected wavelengths. By measuring a distance based on the large number of imaging relative quantities, it is possible to enhance precision in the measurement of the distance. Moreover, the spectrum sensor originally has a high flexibility of the selection of the wavelength. Consequently, it is also easy to properly select light of a suitable wavelength for the measurement of the distance depending on a surrounding environment, an environmental light or the like. Furthermore, the spectrum sensor can detect lights having a plurality of wavelengths in the first place. Therefore, the distance measuring apparatus can be configured simply. In other words, the existing spectrum sensor can be used as the distance measuring apparatus.

To achieve the foregoing objective, the present invention also provided a distance measuring method for measuring distance to a measuring target by optically detecting the measuring target. The method includes: an imaging position calculating step for forming an image of the measuring target by means of a lens having an optical axis in a different orientation from an advancing direction of light incident from the measuring target and obtaining an imaging position indicative of the position of the image with respect to the lens for each of a plurality of wavelengths possessed by the incident light; an imaging relative quantity calculating step for calculating an imaging relative quantity, which is a quantity indicative of a relative relationship between the imaging positions; and a distance calculating step for calculating the object distance by checking the imaging relative quantity against correlation information, which is information determined by the imaging relative quantity, a chromatic aberration characteristic of the lens, and the orientation of the optical axis in order to indicate a correlation between the imaging relative quantity and the object distance.

According to the method, the imaging positions for the respective wavelengths are made different from each other through the lens having an optical axis in a different orientation from the advancing direction of the incident light. Based on the imaging positions for the respective wavelengths, the imaging relative quantities between the imaging positions are detected to be different from each other. In other words, the distance measuring method can measure the distance to the measuring target based on the imaging relative quantities, which are different from each other. An ordinary lens has a refractive index that is varied for each wavelength of the light, that is, causes a chromatic aberration. For this reason, the imaging position is varied for each wavelength when an image of the light having the wavelengths is formed. In a case in which the optical axis of the lens is inclined with respect to the advancing direction of the incident light, accordingly, the lens refracts the incident light to be inclined toward the orientation of the optical axis. Thus, the light is refracted in a refractive index for each wavelength. Therefore, the imaging positions of the light for the respective wavelengths are different from each other in a direction perpendicular to the advancing direction of the incident light (a horizontal direction or a vertical direction of the lens). On the other hand, the object distance to be the distance between the lens and the measuring target is varied with respect to a longitudinal direction of the lens so that an incident angle of the light on the lens is made different. For this reason, the object distance is varied so that an imaging position of a single wavelength light is also changed. According to the distance measuring method, consequently, the distance to the measuring target is measured based on a relative relationship between the imaging positions for the respective wavelengths.

Moreover, the imaging positions for the respective wavelengths are different from each other in the direction perpendicular to the advancing direction of the incident light. The imaging plane is generally provided to face the lens and light having the respective wavelengths is subjected to imaging without a hindrance to detection over the common imaging plane. Consequently, the imaging plane can detect the imaging positions for the respective wavelengths. In other words, it is rarely necessary to move the imaging plane in the longitudinal direction of the lens in order to detect the imaging position. For this reason, an apparatus for moving the imaging plane is not required. In other words, the distance measuring method can detect the imaging positions for the respective wavelengths with a simple structure.

Furthermore, the distance measuring method obtains the difference between the imaging positions for the respective wavelengths based on the chromatic aberration on the basis of the imaging positions for the respective wavelengths that are detected by a common lens, that is, a common optical system. Consequently, a distance can be measured by means of a single optical system, that is, a single camera. Therefore, as compared with a method in which a plurality of cameras is used, for example, it increases the flexibility of the arrangement of the camera in an apparatus employing the distance measuring method.

In addition, an ordinary lens is often subjected to chromatic aberration correction. In other words, the ordinary lens is often configured in such a manner that the imaging distances for the respective wavelengths are coincident with each other for only light having wavelengths to be acquired, for example, only lights having a red wavelength, a blue wavelength and a green wavelength for an image. With the distance measuring method, however, light of a wavelength that is not subjected to chromatic aberration correction can be used for the measurement of the distance. Therefore, it increases the flexibility for selection and design of a wavelength to be used in the distance measuring method. In addition, it also increases the flexibility for selection and design of an optical system in an apparatus employing the distance measuring method.

The incident light may have two wavelengths, and the imaging position calculating step may obtain the imaging position for each of the two wavelengths. The distance calculating step may acquire the correlation information from map data, which causes the imaging relative quantity to correspond to the object distance.

According to the method, it is possible to measure the distance to the measuring target based on light having two wavelengths in which the imaging positions are different from each other. If the light is composed of two wavelengths or more, thus, the distance measuring method can measure the distance to the measuring target. Therefore, it is possible to easily carry out the measurement of the distance.

DETAILED DESCRIPTION OF THE PREFERRED EMBODIMENTS

Figure 1:
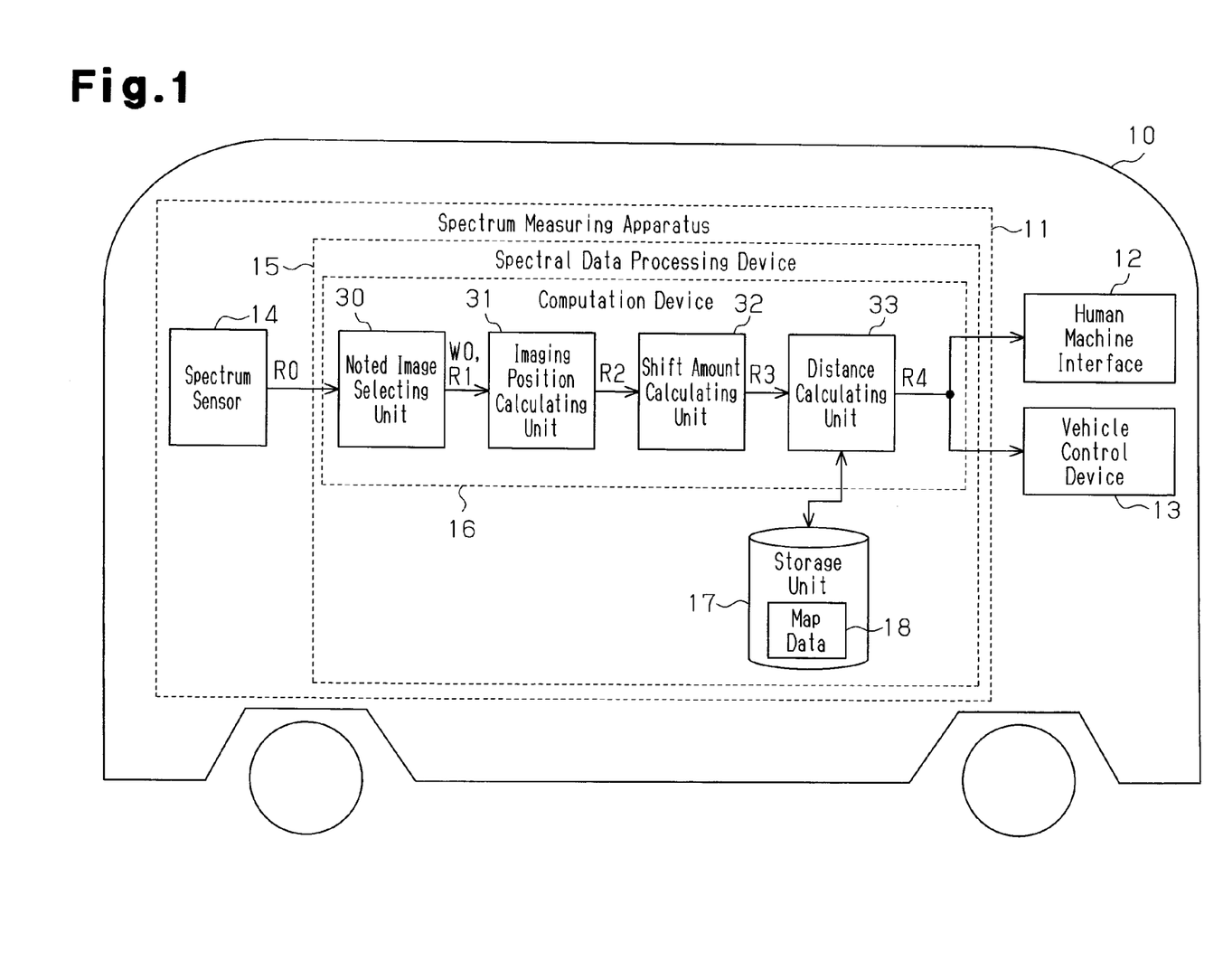
FIG. 1 is a block diagram showing a system structure of a movable body provided with a spectrum measuring apparatus, which is a distance measuring apparatus according to one embodiment of the present invention.
Figures 4A, 4B:
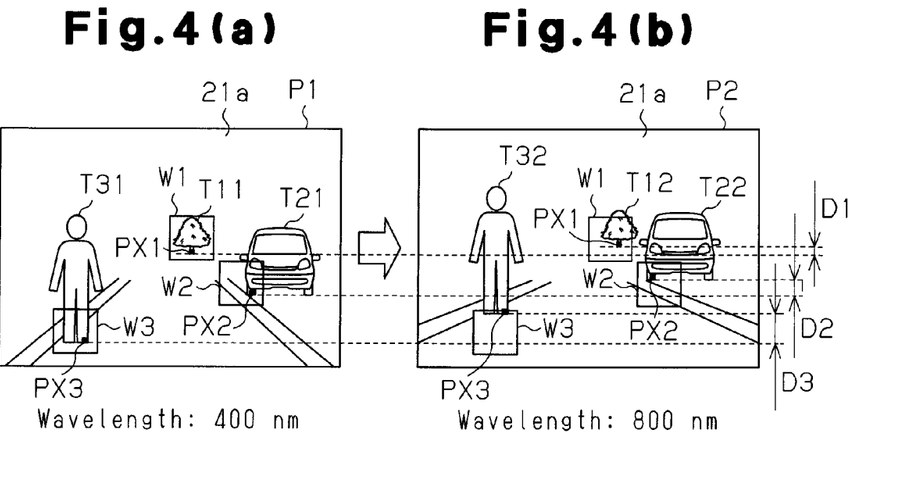
FIGS. 4(a) and 4(b) are schematic diagrams illustrating a mode in which the optical system of FIG. 2 projects an identical measuring target onto an imaging plane with lights having different wavelengths from each other.
Figure 5:
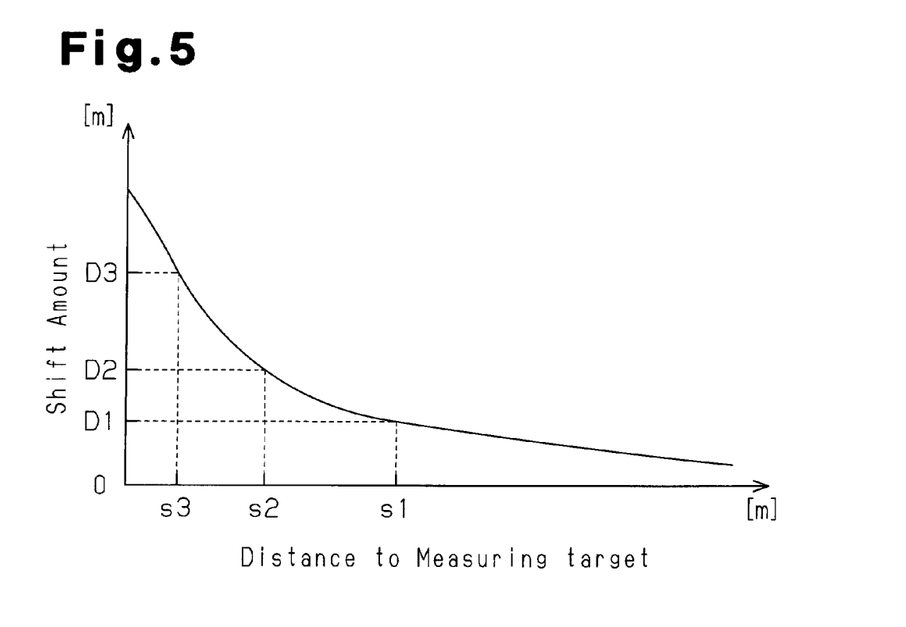
FIG. 5 is a graph showing the relationship between a shift amount detected by the spectrum measuring apparatus in FIG. 1 and the distance to the measuring target.
Figure 6:
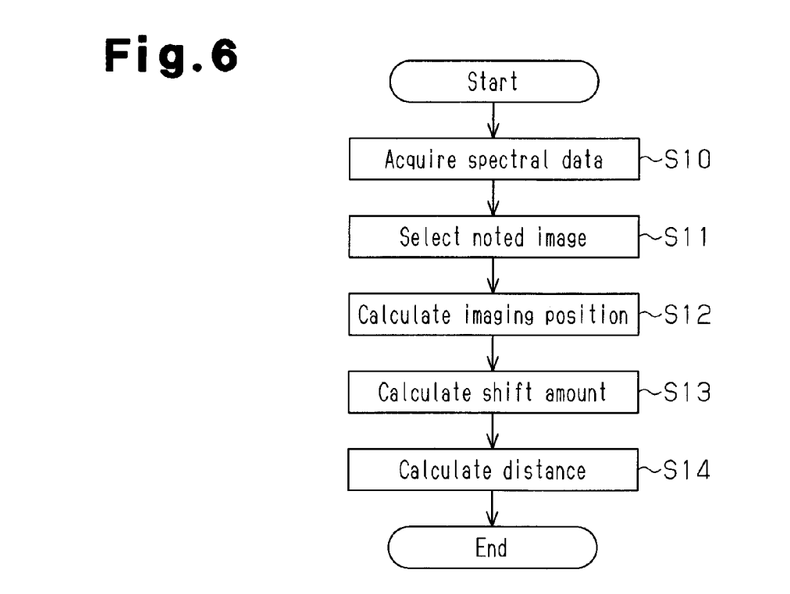
FIG. 6 is a flowchart showing a procedure for measuring a distance by the spectrum measuring apparatus in FIG. 1.

FIGS. 1 to 6 illustrate a spectrum measuring apparatus 11, which is a distance measuring apparatus according to an embodiment of the present invention. In particular, FIGS. 1 to 5 show the system structure of the spectrum measuring apparatus 11 and FIG. 6 shows a flowchart. FIG. 1 is a block diagram showing a system structure of the spectrum measuring apparatus 11 provided on a vehicle 10, which is a movable body.

In recent years, a technique has been considered to be put into practical use that recognizes a measuring target present in a surrounding environment of a spectrum sensor based on multispectral data including an invisible light range measured by the spectrum sensor and offers various supports to a driver depending on the recognized measuring target or the state of the measuring target. For example, a driving support apparatus on a vehicle such as an automobile has been considered that recognizes pedestrians, other vehicles or the like, which are present in the traffic environment around the vehicle based on spectral data measured by the spectrum sensor provided on the vehicle in order to support driving operation or decision making by the driver.

In order to support a driver operating a movable body such as a vehicle, moreover, information indicative of the relative position of a measuring target with respect to the movable body is indispensable for support to avoid or prevent collision of the movable body with other objects, for example. Therefore, some vehicles are conventionally provided with a distance measuring apparatus for measuring the relative position of a measuring target with respect to the vehicle itself, and the apparatuses described in Patent Document 1 and Patent Document 2 are known as distance measuring apparatuses. In a case in which a spectrum measuring apparatus and a distance measuring apparatus are individually provided in a vehicle, however, there is a drawback caused in that an area occupied by these apparatuses in the vehicle is increased, the structure of the overall vehicle is made more complex or cost is increased. Therefore, there is a demand to simplify the system structure obtained by the sensors. For this reason, in the present embodiment, the spectrum measuring apparatus can be used as a distance measuring apparatus capable of measuring distance between the distance measuring apparatus itself and the measuring target with a simple structure even if it is provided on a vehicle or the like.

The spectrum measuring apparatus 11 shown in FIG. 1 has such a structure so as to acquire light information including visible and invisible light from outside of the vehicle, thereby enabling recognition of a measuring target and enabling measurement of the distance between the spectrum measuring apparatus 11 itself and the measuring target. Furthermore, the vehicle 10 includes a human machine interface 12 for transmitting the recognition information, the distance information or the like output from the spectrum measuring apparatus 11 to a passenger of the vehicle 10, and a vehicle control device 13 for reflecting the recognition information, the distance information or the like output from the spectrum measuring apparatus 11 on the control of the vehicle. The spectrum measuring apparatus 11 recognizes a measuring target by a known method. In the present embodiment, therefore, redundant explanation for a structure of a portion of the spectrum measuring apparatus 11 which serves to recognize a measuring target, a portion of a recognition processing for recognizing the measuring target or the like will be omitted for convenience.

The human machine interface 12 transmits a vehicle condition or the like to a passenger, particularly, a driver through light, colors, sound or the like. In other words, the human machine interface 12 is a known interface device provided with an operating device such as a push button or a touch panel in order to input the intention of a passenger through a button or the like.

The vehicle control device 13, which is one of various control devices provided on the vehicle 10 is interconnected to other various control devices such as an engine control device provided similarly on the vehicle directly or indirectly through an on-vehicle network or the like in order to enable a mutual transmission of necessary information. In the present embodiment, when information about the measuring target recognized by the spectrum measuring apparatus 11 or information such as a distance to the measuring target is input from the spectrum measuring apparatus 11, which is connected thereto, the vehicle control device 13 transmits the same information to the other various control devices. Furthermore, the vehicle control device 13 has such a structure so as to execute required driving support in the vehicle 10 depending on the recognized measuring target and the distance to the measuring target.

As shown in FIG. 1, the spectrum measuring apparatus 11 includes a spectrum sensor 14 for detecting spectral data R0 of observed light, which is light obtained by observing a measuring target, and a spectral data processing device 15 for receiving the spectral data R0 from the spectrum sensor 14 and processing the spectral data R0.

The spectrum sensor 14 is configured to generate the spectral data R0 of the observed light by detecting a spectral image of the observed light. A plurality of pixels constituting the spectral image has individual spectral data, respectively.

The spectrum sensor 14 has a function for dispersing observed light, which is light including visible and invisible light, into predetermined wavelength bands. The spectral data R0 output from the spectrum sensor 14 has wavelength information, which is information indicative of a wavelength forming respective wavelength bands after the dispersion, and light intensity information, which is information indicative of light intensity of the observed light for each of the wavelengths of the wavelength bands. The spectrum sensor 14 according to the present embodiment previously selects 400 nm (nanometers) as a first wavelength (λ1) to be used for measuring a distance, that is, a short wavelength, and selects 800 nm as a second wavelength (λ2), which is longer than the short wavelength, that is, a long wavelength. In other words, the spectral data R0 includes spectral data configured by light of 400 nm and spectral data configured by light of 800 nm. Moreover, the spectrum sensor 14 also has a function for regulating observed light according to a predetermined wavelength band.

Figure 2:
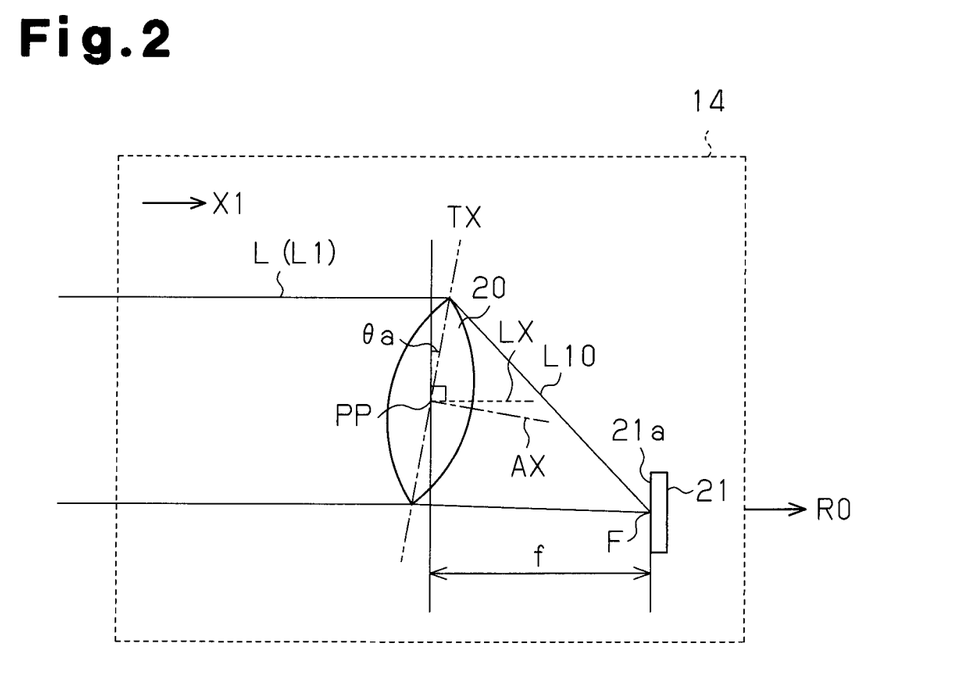
FIG. 2 is a schematic diagram showing the structure of an optical system used in the spectrum measuring apparatus illustrated in FIG. 1.

As shown in FIG. 2, the spectrum sensor 14 includes a lens 20 for imaging incident light L and a detecting device 21 for detecting the light subjected to the imaging through the lens 20. Furthermore, the spectrum sensor 14 includes a filter (not shown) for generating the incident light L from observed light. In other words, the filter according to the present embodiment selects, from the observed light, a light component having a wavelength that is a main part of various light components composing the incident light L.

The detecting device 21 is configured by a light receiving element such as a CCD. An imaging plane 21a, which is an image pickup plane configured by a light receiving surface of the light receiving element is disposed to face the lens 20. In other words, the detecting device 21 detects, over the imaging plane 21a, light intensity information of the incident light L in a state in which imaging is carried out by the lens.

The lens 20 is a convex lens. When the incident light L is incident on the lens 20, therefore, a transmitted light refracted to be collected is emitted from the lens 20. The light emitted from the lens forms an image on an imaging point F. In the present embodiment, an advancing direction X1 of the incident light L is inclined by a inclination angle θa with respect to an optical axis of the lens 20. In other words, an optical axis AX of the lens 20 has a different orientation from the advancing direction X1 of the incident light L. In other words, a main plane TX of the lens 20 is inclined by the inclination angle θa with respect to a perpendicular surface to the advancing direction X1 of the incident light L. The main plane TX of the lens 20 is a surface that passes through a main point PP of the lens 20 and is perpendicular to the optical axis AX of the lens 20. The main plane TX of the lens 20 passes through a center in a vertical direction of the lens 20. The lens 20 can be designed by a known lens designing technique.

The incident angle of each position component of the incident light L, which is incident on each position over a surface of the lens 20, is not rotationally symmetrical with respect to the optical axis AX of the lens 20 because of the presence of the inclination angle θa of the lens 20. In other words, the position component of the incident light L is incident on the lens 20 at an incident angle that is non-rotationally symmetrical. Accordingly, the position component of the incident light L is refracted in each lens 20 portion at a refraction angle that is non-rotationally symmetrical with respect to the optical axis AX of the lens 20. Therefore, the imaging point F is not present on an extended line LX in the advancing direction X1 from the main point PP of the lens 20. The imaging point F is present apart from the extended line LX.

For this reason, when the incident light L is incident on the lens 20 inclined with respect to the advancing direction X1, it is refracted at a refraction angle that is non-rotationally symmetrical for each portion of the lens 20. In other words, light L10 emitted from the lens 20 advances in a different orientation from the advancing direction X1 of a far incident light L1 and an image is thus formed on the imaging point F.

The lens 20 has a property having a refractive index that is varied for each wavelength of the light, that is, so-called chromatic aberration. For this reason, light components having respective wavelengths in the light L10 emitted from the lens 20 are emitted from the lens 20 in different orientations from each other at refractive indices corresponding to the respective wavelengths. In other words, the light L10 is emitted at a non-rotationally symmetrical refraction angle based on the refractive indices, which are different from each other for each wavelength of the light, and advances in an orientation corresponding to each of the refraction angles so that an image is formed on the imaging point F in different positions from each other. More specifically, the imaging points F for lights having respective wavelengths are formed in different positions from each other for each wavelength of the incident light L over the common imaging plane 21a.

The imaging point F for a short wavelength and the imaging point F for a long wavelength do not always carry out imaging on the common imaging plane 21a but it can be supposed that an axial chromatic aberration is also generated slightly. In the present embodiment, however, the inclination angle θa, a range of an object distance s, which is the distance to a measuring target, a material of the lens 20 and a refractive index are preset in such a manner that the axial chromatic aberration is included within a range of a focal depth as compared with the difference between positions of the imaging point F for the short wavelength and the imaging point F for the long wavelength over the single imaging plane 21a, that is, a shift amount. In other words, it is assumed that the axial chromatic aberration can be disregarded as compared with the shift amount of an imaging position in a horizontal direction or a vertical direction of the lens 20.

Figure 3A:
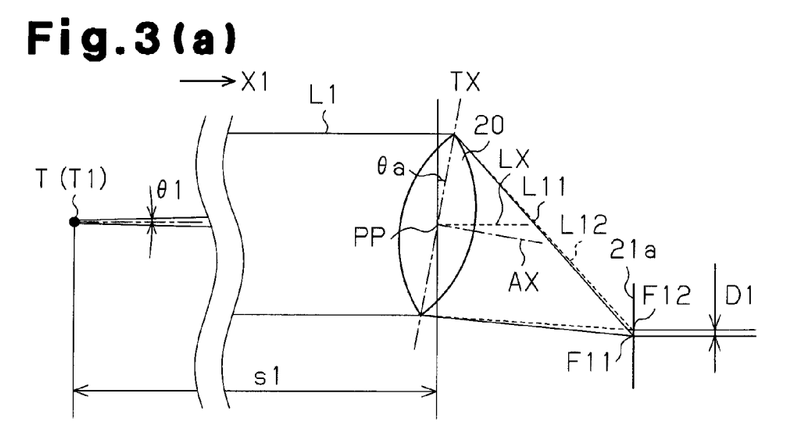
FIGS. 3(a) to 3(c) are schematic diagrams showing an imaging position in which the optical system in FIG. 2 forms an image of a measuring target, where: 3(a) is a diagram showing an imaging position in a case in which the measuring target is distant; 3(b) is a diagram showing an imaging position in a case in which the measuring target is closer to a lens than that in the case of 3(a); and 3(c) is a diagram showing an imaging position in a case in which the measuring target is closer to the lens than that in the case of 3(b)
Figure 3B:
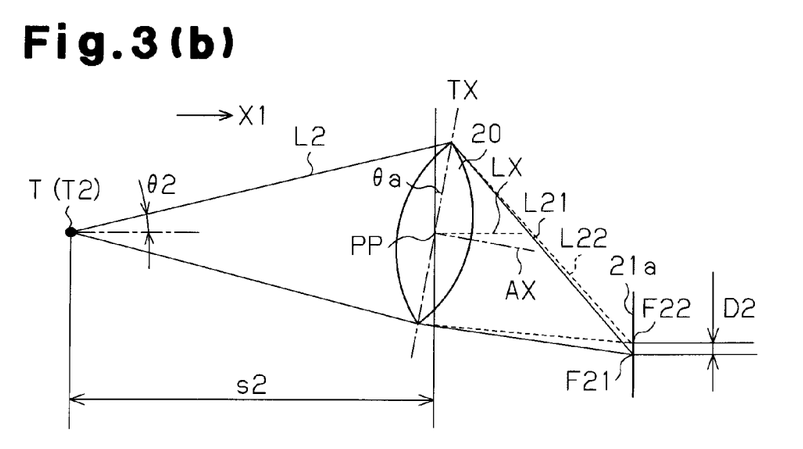
Figure 3C:
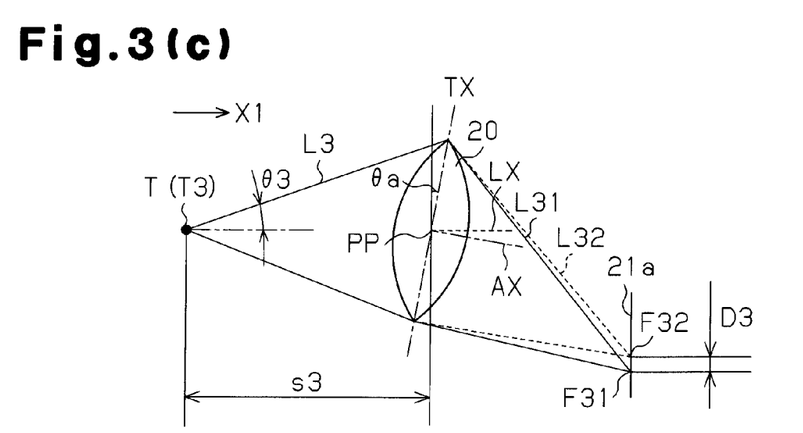

FIGS. 3(a) to 3(c) are views for explaining a relationship between an imaging position and an object distance s, which is the distance from the spectrum sensor 14 to a measuring target T. FIG. 3(a) shows the case of a far measuring target T1 in which a measuring target is present in a distant place. FIG. 3(b) shows the case of a middle measuring target T2 in which the measuring target is present closer to the lens 20 than in the case of FIG. 3(a). FIG. 3(c) shows the case of a near measuring target T3 in which the measuring target is present closer to the lens 20 than in the case of FIG. 3(b).

FIG. 3(a) shows the far measuring target T1 present at a far object distance s1 which can be evaluated as an infinite distance from the lens 20. In this case, far incident light L1, which is incident light from the far measuring target T1, is incident as almost parallel light in the advancing direction X1 on the lens 20. If the far incident light L1 is a single wavelength of light having only light of a short wavelength, which is a first wavelength, for example, a wavelength of 400 nm, which is refracted based on a refractive index of the lens 20 corresponding to the wavelength of 400 nm and a refractive index corresponding to the inclination angle θa of the lens 20 and is emitted as a far short emitted light L11 from the lens 20. The far short emitted light L11 carries out imaging at a far short imaging point F11 on the imaging plane 21a.

On the other hand, if the far incident light L1 is a single wavelength light having only light of a long wavelength that is a second wavelength, which is different from the short wavelength, for example, a wavelength of 800 nm, it is refracted based on a refractive index of the lens 20, which corresponds to the wavelength of 800 nm, and a refractive index corresponding to the inclination angle θa of the lens 20 and is emitted as a far long emitted light L12 from the lens 20. An image of the far long emitted light L12 is formed on a far long imaging point F12 over the imaging plane 21a. In the case of a lens that is not subjected to a chromatic aberration correction, generally, the refractive index tends to be increased with a reduction in the wavelength. As shown in FIG. 3(a), consequently, the refraction of the far short emitted light L11 having a short wavelength (a wavelength of 400 nm) is higher than the refraction of the far long emitted light L12 having the long wavelength of 800 nm. Accordingly, the position of the far long imaging point F12 of the far long emitted light L12 is different from that of the far short imaging point F11 of the far short emitted light L11 over the common imaging plane 21a. The far short imaging point F11 is positioned in a more distant place than a place in which the far long imaging point F12 is positioned with respect to the extended line LX in the advancing direction X1, which passes through the main point PP of the lens 20. In FIG. 3(a), the far short imaging point F11 is positioned in a lower place than a place in which the far long imaging point F12 is positioned. For this reason, a far shift amount D1 (D1=the position of the far short imaging point F11−the position of the far long imaging point F12) is generated in a vertical direction, for example, as a shift amount, which is the quantity of a relative relationship, that is, an imaging relative quantity due to a shift of an imaging position that is caused by the difference in a wavelength between the position of the far short imaging point F11 of the far short emitted light L11 and that of the far long imaging point F12 of the far long emitted light L12. The far shift amount D1 represents a distance in a direction perpendicular to the extended line LX in the advancing direction X1, which passes through the main point PP of the lens 20.

FIG. 3(b) shows a middle measuring target T2 positioned at a middle object distance s2 in which the distance from the lens 20 is smaller than the far object distance s1. A middle expansion angle θ2 shown in FIG. 3(b) indicates an expansion angle representing a degree at which a middle incident light L2, which is an incident light in this case, expands from the measuring target T toward a peripheral edge portion of the lens 20, that is, an intake angle. When the expansion angle is increased, the incident angle on the lens 20 is increased. A far expansion angle θ1, which is an expansion angle in the case of FIG. 3(a), is almost zero. In a case in which the middle incident light L2 from the middle measuring target T2 is a single wavelength light having a short wavelength of 400 nm, the middle incident light L2 is refracted based on a refractive index of the lens 20 corresponding to a short wavelength, a refraction angle obtained by an inclination angle θa of the lens 20, and a refraction angle obtained by the middle expansion angle θ2 toward the lens 20. An image of a middle short emitted light L21 emitted from the lens 20 in this case is formed on a middle short imaging point F21 over an imaging plane 21a that is almost the same as that in the case of FIG. 3(a).

On the other hand, if the middle incident light L2 is a single wavelength light having a long wavelength of 800 nm, the middle incident light L2 is refracted based on a refractive index of the lens 20 that corresponds to a long wavelength, a refraction angle obtained by the inclination angle θa of the lens 20, and a refraction angle defined by the middle expansion angle θ2 toward the lens 20. An image of a middle long emitted light L22 emitted from the lens 20 is formed on a middle long imaging point F22 over almost the same imaging plane 21a. Since the lens 20 is not subjected to the chromatic aberration correction, the refraction of the middle short emitted light L21 having the short wavelength of 400 nm is higher than that of the middle long emitted light L22 having the long wavelength of 800 nm as shown in FIG. 3(b). Accordingly, the position of the middle long imaging point F22 of the middle long emitted light L22 is different from that of the middle short imaging point F21 of the middle short emitted light L21 over the common imaging plane 21a. For this reason, a middle shift amount D2 (D2=the position of the middle short imaging point F21−the position of the middle long imaging point F22) is generated in a vertical direction, for example, as a quantity of a relative relationship due to a shift of an imaging position that is caused by the difference in wavelength between the position of the middle short imaging point F21 of the middle short emitted light L21 and that of the middle long imaging point F22 of the middle long emitted light L22. The refraction angle obtained by the inclination angle θa of the lens 20 and the refraction angle defined by the middle expansion angle θ2 toward the lens 20 indicate a non-rotationally symmetrical refraction angle of the lens 20.

FIG. 3(c) shows a near measuring target T3, which is present at a near object distance s3, which is a shorter distance from the lens 20 than the middle object distance s2. A near expansion angle θ3 shown in FIG. 3(c) is greater than the middle expansion angle θ2 in FIG. 3(b). In a case in which a near incident light L3 from the near measuring target T3 is a single wavelength light having a short wavelength of 400 nm, the near incident light L3 is refracted based on the refractive index of the lens 20 corresponding to the short wavelength, the refraction angle obtained by the inclination angle θa of the lens 20, and a refraction angle defined by the near expansion angle θ3 toward the lens 20. An image of near short emitted light L31 emitted from the lens 20 is formed on a near short imaging point F31 over almost the same imaging plane 21a.

On the other hand, if the near incident light L3 is single wavelength light having a long wavelength of 800 nm, the near incident light L3 is refracted based on a refractive index of the lens 20 that corresponds to a long wavelength, a refraction angle obtained by the inclination angle θa of the lens 20, and a refraction angle defined by the near expansion angle θ3 toward the lens 20. For example, an image of a near long emitted light L32 emitted from the lens 20 is formed on a near long imaging point F32 over almost the same imaging plane 21a. Since the lens 20 is not subjected to the chromatic aberration correction, the refraction of the near short emitted light L31 having the short wavelength of 400 nm is higher than that of the near long emitted light L32 having the long wavelength of 800 nm as shown in FIG. 3(c). Accordingly, the position of the near long imaging point F32 over the imaging plane 21a is different from that of the near short imaging point F31. For this reason, a near shift amount D3 (D3=the position of the near long imaging point F32−the position of the near short imaging point F31) is generated in a vertical direction as a quantity of a relative relationship, which is a shift of an imaging position that is caused by the difference in wavelength between the position of the near short imaging point F31 and that of the near long imaging point F32.

In general, the refraction angle of the lens 20 with respect to the incident light having a short wavelength depends on the difference in the incident angle. That is, the refraction angle of the far object distance s1 with respect to the far incident light L1, the refraction angle of the middle object distance s2 with respect to the middle incident light L2 and the refraction angle of the near object distance s3 with respect to the near incident light L3 are different from each other. Similarly, the refraction angle of the lens 20 with respect to the incident light having a long wavelength depends on the difference in the incident angle. That is, the refraction angle of the far object distance s1 with respect to the far incident light L1, the refraction angle of the middle object distance s2 with respect to the middle incident light L2 and the refraction angle of the near object distance s3 with respect to the near incident light L3 are different from each other.

Moreover, a relative relationship such as the ratio of the non-rotationally symmetrical refraction angle of the lens 20 with respect to the incident light having a short wavelength to the non-rotationally symmetrical refraction angle of the lens 20 with respect to the incident light having a long wavelength to the far object distance s1 is not usually coincident with a relative relationship such as the ratio of the non-rotationally symmetrical refraction angle of the lens 20 with respect to the incident light having a short wavelength to the non-rotationally symmetrical refraction angle of the lens 20 with respect to the incident light having a long wavelength to the middle object distance s2. Furthermore, a relative relationship such as the ratio of the non-rotationally symmetrical refraction angle of the lens 20 with respect to the incident angle having a short wavelength to the non-rotationally symmetrical refraction angle of the lens 20 with respect to the incident light having a long wavelength to the middle object distance s2 is not usually coincident with a relative relationship such as the ratio of the non-rotationally symmetrical refraction angle of the lens 20 with respect to the incident light having a short wavelength to the non-rotationally symmetrical refraction angle of the lens 20 with respect to the incident light having a long wavelength to the near object distance s3. In addition, the relative relationship such as the ratio of the non-rotationally symmetrical refraction angle of the lens 20 with respect to the incident light having a short wavelength to the non-rotationally symmetrical refraction angle of the lens 20 with respect to the incident light having a long wavelength to the far object distance s1 is not usually coincident with the relative relationship such as the ratio of the non-rotationally symmetrical refraction angle of the lens 20 with respect to the incident light having a short wavelength to the non-rotationally symmetrical refraction angle of the lens 20 with respect to the incident light having a long wavelength to the near object distance s3.

Accordingly, the far shift amount D1 in the case of the far object distance s1 to the far measuring target T1, the middle shift amount D2 in the case of the middle object distance s2 to the middle measuring target T2, and the near shift amount D3 in the case of the near object distance s3 to the near measuring target T3 are different from each other. For this reason, in the spectrum measuring apparatus 11, it can be concluded that the far shift amount D1 corresponds to the far object distance s1, the middle shift amount D2 corresponds to the middle object distance s2, and the near shift amount D3 corresponds to the near object distance s3. In other words, it can be concluded that the object distance s and the shift amount D have a unique corresponding relationship in the spectrum measuring apparatus 11. Accordingly, the spectrum measuring apparatus 11 can measure the object distance s to be the distance to the measuring target T by using chromatic aberration of magnification.

As shown in FIG. 4, it is assumed that a pedestrian T3, the other vehicle T2 and a tree T1 are present as measuring targets at a short distance, a middle distance and a long distance in the image pickup region of the spectrum sensor 14, respectively. As shown in FIG. 4(a), a short wave image P1 in which the far incident light L1 having a short wavelength of 400 nm is projected onto the imaging plane 21a in this case includes a short wave pedestrian image T31, which is an image of the pedestrian T3, a short wave other vehicle image T21, which is an image of the other vehicle T2, and a short wave tree image T11, which is an image of the tree T1.

On the other hand, as shown in FIG. 4(b), a long wave image P2 in which the far incident light L1 having a long wavelength of 800 nm is projected onto the imaging plane 21a includes a long wave pedestrian image T32, which is the image of the pedestrian T3, a long wave other vehicle image T22, which is the image of the other vehicle T2, and a long wave tree image T12, which is the image of the tree T1.

In other words, the actual object of the short wave pedestrian image T31 of the short wave image P1 is the pedestrian T3, which is the same as the actual object of the long wave pedestrian image T32 of the long wave image P2. The actual object of the short wave other vehicle image T21 of the short wave image P1 is the other vehicle T2, which is the same as an actual object of the long wave other vehicle image T22 of the long wave image P2. The actual object of the short wave tree image T11 of the short wave image P1 is the tree T1, which is the same as an actual object of the long wave tree image T12 of the long wave image P2.

A third detecting region W3 for comparing an imaging position of the pedestrian T3 for each wavelength, a second detecting region W2 for comparing an imaging position of the other vehicle T2 for each wavelength and a first detecting region W1 for comparing an imaging position of the tree T1 for each wavelength are set to the short wave image P1 and the long wave image P2, respectively. With respect to the imaging plane 21a, the position of the third detecting region W3 of the short wave image P1 is set to be identical to the position of the third detecting region W3 of the long wave image P2. With respect to the imaging plane 21a, similarly, the position of the second detecting region W2 of the short wave image P1 is set to be identical to the position of the second detecting region W2 of the long wave image P2. With respect to the imaging plane 21a, the position of the first detecting region W1 of the short wave image P1 is set to be identical to the position of the first detecting region W1 of the long wave image P2.

As described above, the spectrum sensor 14 according to the present embodiment changes an imaging position of a measuring target between the short wavelength of 400 nm and the long wavelength of 800 nm. Consequently, in a case in which the distance to the pedestrian T3 is the near object distance S3, for example, the near shift amount D3 is generated in a vertical direction between the position of the short wave pedestrian image T31 and that of the long wave pedestrian image T32 in the imaging plane 21a. Moreover, in a case in which the distance to the other vehicle T2 is the middle object distance s2, for example, the middle shift amount D2 is generated in the vertical direction between the position of the short wave other vehicle image T21 and the position of the long wave other vehicle image T22 in the imaging plane 21a. In addition, in a case in which the distance to the tree T1 is the far object distance s1, for example, the far shift amount D1 is generated in the vertical direction between the position of the short wave tree image T11 and the position of the long wave tree image T12 in the imaging plane 21a.

In other words, the spectrum sensor 14 can determine that the distance to the pedestrian T3 is the near object distance s3 based on the fact that the shift between the position of the short wave pedestrian image T31 and that of the long wave pedestrian image T32 is equal to the near shift amount D3. Moreover, the spectrum sensor 14 can determine that the distance to the other vehicle T2 is the middle object distance s2 based on the fact that the shift between the position of the short wave other vehicle image T21 and that of the long wave other vehicle image T22 is equal to the middle shift amount D2. Furthermore, the spectrum sensor 14 can determine that the distance to the tree T1 is the far object distance s1 based on the fact that the shift between the position of the short wave tree image T11 and that of the long wave tree image T12 is equal to the far shift amount D1. More specifically, the spectrum sensor 14 can grasp the object distance s from a shift amount, that is, the difference between an imaging position of an image based on a short wavelength of the measuring target and that of an image based on a long wavelength of the measuring target in the imaging plane 21a.

As shown in FIG. 1, the spectrum sensor 14 thus detects the spectral data R0 configured by the short wave image P1, which is a spectral image based on a short wavelength, and the long wave image P2, which is a spectral image based on a long wavelength, with respect to the measuring target T. Then, the spectrum sensor 14 outputs the spectral data R0 to the spectral data processing device 15.

The spectral data processing device 15 is mainly configured by a microcomputer having a computation device, a storage unit and the like, for example. The spectral data processing device 15 is connected to the spectrum sensor 14, and furthermore, the spectral data R0 of the observed light detected by the spectrum sensor 14 is input to the spectral data processing device 15. The spectral data processing device 15 calculates, that is, measures the object distance s based on the spectral data R0 of the observed light input thereto.

The spectral data processing device 15 includes a computation device 16 and a storage unit 17 serving as storage means. The storage unit 17 is configured by a whole or part of a storage area provided in the well-known storage device.

FIG. 5 shows an example of map data 18 stored in the storage area. The map data 18 indicates the shift amount (D1, D2, D3 or the like), which is the difference between the imaging position of the light having the short wavelength and the imaging position of the light having the long wavelength in such a manner as to be related to the object distance s (s1, s2, s3 or the like), which is the distance to the measuring target T. In other words, the map data 18 stores the far shift amount D1, which is the difference between the position of the far short imaging point F11 and that of the far long imaging point F12 in relation to the far object distance s1 to the far measuring target T1. Furthermore, the map data 18 stores the middle shift amount D2, which is the difference between the position of the middle short imaging point F21 and that of the middle long imaging point F22 in relation to the middle object distance s2 to the middle measuring target T2. In addition, the map data 18 stores the near shift amount D3, which is the difference between the position of the near short imaging point F31 and that of the near long imaging point F32 in relation to the near object distance s3 to the near measuring target T3. Accordingly, the computation device 16 can acquire, from the map data 18, the long object distance s1 based on the far shift amount D1, the middle object distance s2 based on the middle shift amount D2 or the near object distance s3 based on the near shift amount D3. In other words, the map data 18 constitutes correlation information, which is information determined by the chromatic aberration characteristic of the lens 20 and the orientation of the optical axis AX in order to indicate a correlation between the shift amount D, which is an imaging relative quantity and the object distance s.

The computation device 16 includes a noted image selecting unit 30 for selecting any of the images of the measuring target T that will be used for measuring a distance; an imaging position calculating unit 31 for detecting imaging positions for two wavelengths from the selected image; and a shift amount calculating unit 32 for calculating the shift amount D, which is the difference between the imaging positions for two wavelengths. Furthermore, the computation device 16 includes a distance calculating unit 33 serving as distance calculating means for calculating the object distance s from the shift amount D. The imaging position calculating unit 31 and the shift amount calculating unit 32 constitute imaging relative quantity calculating means serving as relative relationship quantity calculating means.

The noted image selecting unit 30 selects any of the images of the measuring target T that will be used for measuring a distance on a pixel unit. When inputting the spectral data R0 from the spectrum sensor 14, the noted image selecting unit 30 outputs, to the imaging position calculating unit 31, noted image information W0 and spectral data R1 including spectral images for two wavelengths. The noted image selecting unit 30 may select an image corresponding to a measuring target having a high priority from the recognized measuring targets based on an object recognition processing carried out separately or may select an image corresponding to a measuring target occupying a large number of areas when the image is to be selected. Moreover, it is preferable that the image to be selected by the noted image selecting unit 30 should be a boundary portion with a background or the like in order to enable an identification of positions of images having two wavelengths which are different from each other, respectively.

FIG. 4(a) shows the short wave image P1, which is an image having a short wavelength, and FIG. 4(b) shows the long wave image P2 which is an image having a long wavelength. It is assumed that the far measuring target T1 is a "tree", the middle measuring target T2 is "the other vehicle" and the near measuring target T3 is a "pedestrian". The short wave image P1 in FIG. 4(a) indicates the short wave tree image T11, which is an image of the tree, the short wave other vehicle image T21, which is an image of the other vehicle, and the short wave pedestrian image T31, which is an image of the pedestrian. The long wave image P2 in FIG. 4(b) indicates the long wave tree image T12, which is an image of the tree, the long wave other vehicle image T22, which is an image of the other vehicle, and the long wave pedestrian image T32, which is an image of the pedestrian.

The noted image selecting unit 30 selects a first noted image PX1 from the short wave tree image T11 and the long wave tree image T12 in a case in which the tree T1 is the measuring target. The noted image selecting unit 30 sets the first detecting region W1 in which both the short wave image P1 and the long wave image P2 include the first noted image PX1. The first noted image PX1 indicates a boundary line between a bottom of the tree T1 and ground provided under the bottom.

Moreover, the noted image selecting unit 30 selects a second noted image PX2 from the short wave other vehicle image T21 and the long wave other vehicle image T22 in a case in which the other vehicle T2 is the measuring target. The noted image selecting unit 30 sets the second detecting region W2 in which both the short wave image P1 and the long wave image P2 include the second noted image PX2. The second noted image PX2 includes a boundary line between a tire of the other vehicle T2 and a road surface provided under the tire.

Furthermore, the noted image selecting unit 30 selects a third noted image PX3 from the short wave pedestrian image T31 and the long wave pedestrian image T32 in a case in which the pedestrian T3 is the measuring target, for example. In addition, the noted image selecting unit 30 sets the third detecting region W3 in which both the short wave image P1 and the long wave image P2 include the third noted image PX3. The third noted image PX3 includes a boundary line between shoes of the pedestrian T3 and the road surface provided under the shoes.

In other words, the noted image selecting unit 30 generates the noted image information W0 including the first noted image PX1 and the first detecting region W1, the second noted image PX2 and the second detecting region W2, and the third noted image PX3 and the third detecting region W3, and outputs the noted image information W0 to the imaging position calculating unit 31.

The imaging position calculating unit 31 detects imaging positions for images having two wavelengths respectively based on the noted image selected by the noted image selecting unit 30. The imaging position calculating unit 31 inputs the noted image information W0 and the spectral data R1 from the noted image selecting unit 30, and furthermore, calculates the imaging positions for two wavelengths of the noted image based on the noted image information W0 and the spectral data R1. Then, the imaging position calculating unit 31 outputs, to the shift amount calculating unit 32, the imaging position data R2 including the imaging positions for the calculated two wavelengths.

The shift amount calculating unit 32 calculates the shift amount D from the imaging positions for the two wavelengths. The shift amount calculating unit 32 calculates, as the shift amount D, the difference between the imaging positions for the two wavelengths (for example, the position of the far short imaging point F11 and the position of the far long imaging point F12) based on the imaging position data R2 input from the imaging position calculating unit 31. The shift amount calculating unit 32 outputs the calculated shift amount D as shift amount data R3, which is data related to the two wavelengths to the distance calculating unit 33.

The distance calculating unit 33 calculates the object distance s based on the shift amount data R3. In other words, the distance calculating unit 33 selects, from the storage unit 17, the map data 18 corresponding to the two wavelengths (for example, 400 nm and 800 nm) acquired from the shift amount data R3 based on the two wavelengths. Then, the distance calculating unit 33 acquires, from the selected map data 18, the object distance s (for example, the far object distance s1) corresponding to the shift amount acquired from the shift amount data R3 (for example, the far shift amount D1). The distance calculating unit 33 generates distance data R4 by relating the acquired object distance s to the measuring target T, for example, and outputs the distance data R4 to the human machine interface 12, the vehicle control device 13 and the like.

FIG. 6 explains a procedure for measuring the object distance s. FIG. 6 is a flowchart showing the procedure for measuring the object distance s by the spectrum measuring apparatus 11 according to the present embodiment. In the present embodiment, the procedure for measuring the object distance s is successively executed in a predetermined cycle.

As shown in FIG. 6, when processing for measuring distance is started, the computation device 16 acquires the spectral data R0 detected by the spectrum sensor 14 at Step S10. When acquiring the spectral data R0, the computation device 16 selects a noted image from the images of the measuring target T of which distance is to be measured at Step S11. The measuring target T is selected by setting, as a condition, a measuring target recognized separately by the spectrum measuring apparatus 11, a priority of the measuring target or the like. When the noted image is selected, the computation device 16 calculates an imaging position of the noted image for each of short and long wavelengths to be used for measuring a distance at Step S12 (an imaging position calculating step). The imaging position is obtained based on the position of the pixel on the imaging plane 21a in which the noted image is to be detected. When the imaging position is calculated, the computation device 16 compares the positions of the noted images for the two wavelengths with each other, thereby calculating the shift amount D to be an imaging relative quantity at Step S13 (an imaging relative quantity calculating step). The shift amount D (D1, D2, D3) is calculated as the difference between the imaging positions of the respective noted images having the two wavelengths. When calculating the shift amount D, the computation device 16 calculates the object distance s at Step S14 (a distance calculating step). The computation device 16 calculates the object distance s by acquiring the distance corresponding to the shift amount D from the map data 18 corresponding to the two wavelengths.

As described above, according to the spectrum measuring apparatus 11 in accordance with the present embodiment, it is possible to obtain the following listed advantages.

(1) The spectrum measuring apparatus 11 uses the lens 20 having the optical axis AX in the orientation different from the advancing direction X1 of the incident light L so that the imaging positions for the respective wavelengths are different from each other. Consequently, the imaging relative quantity between the imaging positions is detected as a quantity that is varied for each object distance s. In other words, the spectrum measuring apparatus 11 can measure the object distance s based on the imaging relative quantities, which are different from each other. An ordinary lens has a refractive index that is varied for each light having a different wavelength, that is, causes chromatic aberration. For this reason, when the lens 20 carries out imaging over lights having a plurality of wavelengths, the imaging position is varied for each light having a different wavelength. In a case in which the optical axis AX of the lens 20 is inclined with respect to the advancing direction X1 of the far incident light L1, that is, the case in which the lens 20 refracts the far incident light L1 in the orientation of the optical axis AX thereof, consequently, the lights having the respective wavelengths are refracted in the respective refractive indices. Accordingly, the imaging position of the image formed by the lens 20 (the position of the imaging point) is displaced in different quantities from each other in a horizontal direction or a vertical direction of the lens 20 for each light having a different wavelength. On the other hand, when the incident angle of the light on the lens 20 is varied depending on a change in the object distance s between the lens 20 and the measuring target T, the imaging position of light of a single wavelength is also changed. Consequently, the spectrum measuring apparatus 11 can measure the object distance s based on a relative relationship between the imaging positions for the respective wavelengths.

(2) The imaging positions for the respective wavelengths are varied in the horizontal direction or the vertical direction of the lens 20. In other words, the imaging positions for the respective wavelengths are displaced in different quantities from each other in a direction perpendicular to the advancing direction X1 of the incident light L. Consequently, images for the respective wavelengths are formed on the imaging plane 21*a*, which is generally provided to face the lens 20. Accordingly, the imaging plane 21*a* can detect the respective imaging positions of the images of the lights having the respective wavelengths. In other words, the spectrum measuring apparatus 11 does not need to move the imaging plane 21*a* in order to detect the imaging position. For this reason, a device for moving the imaging plane 21*a* is not required. Thus, the imaging positions for the respective wavelengths can be detected with a simple structure.

(3) By detecting the imaging positions for the respective wavelengths through the same lens 20 (the optical system), it is possible to obtain the difference between the imaging positions for the respective wavelengths based on the chromatic aberration. In other words, the distance can be measured by means of a single optical system, that is, a single camera (the spectrum sensor 14). Therefore, as compared with the case in which a plurality of cameras is used, for example, the flexibility of the arrangement of the camera can be enhanced in the present embodiment. In other words, the arranging position of the camera does not need to be maintained with high precision but the structure of the distance measuring apparatus can be simplified.

(4) An ordinary lens is subjected to a chromatic aberration correction. In other words, the ordinary lens is often configured in such a manner that the imaging distances of the lights having the respective wavelengths are coincident with each other for only lights having wavelengths to be acquired, for example, only lights having a red wavelength, a blue wavelength and a green wavelength for an image. In the present embodiment, however, it is possible to use, for the measurement of the distance, the lens 20 which is not subjected to the chromatic aberration correction. Accordingly, it increases the flexibility of the selection and a design of a wavelength to be used in the distance measuring apparatus, and furthermore, it also increases the flexibility of the selection and a design of the optical system to be employed for the distance measuring apparatus.

(5) The spectrum measuring apparatus 11 measures the object distance s based on light having two wavelengths in which the imaging positions (the positions of the imaging (focus) points) through the lens 20 are different from each other. In other words, if the light emitted from the measuring target T has two wavelengths or more, the distance of the measuring target T can be measured. Therefore, it is possible to easily carry out the measurement of the distance.

(6) The spectrum measuring apparatus 11 detects the imaging relative quantity as the difference between the imaging positions for two wavelengths, that is, the shift amount D (D1, D2, D3). Accordingly, it is possible to easily carry out a calculation related to the detection or the like.

(7) The spectrum measuring apparatus 11 inclines the optical axis AX of the lens 20 with respect to the far incident light L1, thereby making the difference between the imaging positions for the lights having the respective wavelengths. The spectrum measuring apparatus 11 measures the object distance s based on the difference between the imaging positions. For example, in the case of a general convex lens, the lens 20 is disposed with an inclination to the advancing direction X1 of the far incident light L1. Consequently, it is possible to incline the optical axis AX of the lens 20 with respect to the advancing direction X1 of the far incident light L1. In the present embodiment, thus, it is possible to simplify the arrangement or mode of the lens 20 in the distance measuring apparatus or the characteristic of the lens 20.

(8) By detecting the image for each wavelength of the measuring target T, which is formed by the lens 20 through the spectrum sensor 14, it is possible to detect lights having a plurality of optional wavelengths. Accordingly, the flexibility of the selection of the wavelength is high. Consequently, it is also easy to properly select light of a suitable wavelength for measuring a distance depending on the surrounding environment, environmental light or the like. Moreover, the spectrum sensor 14 can originally detect light having a plurality of wavelengths. Therefore, the distance measuring apparatus can be configured simply. In other words, the existing spectrum sensor can also be practically used as the distance measuring apparatus.

The embodiment may also be carried out in the following modes, for example.

In the embodiment, there is described the case in which the wavelength of the light that is incident on the lens 20 is set to be a short wavelength or a long wavelength by a filter. However, the present invention is not restricted thereto but the filter may acquire an emitted light having a predetermined light from the lights emitted from the lens 20. Accordingly, it increases the flexibility of the structure for acquiring light having a predetermined wavelength.

In the embodiment, a combination of the wavelengths of the difference (the shift amount) between the imaging positions, which is stored by the map data 18, includes a short wavelength and a long wavelength. However, the present invention is not restricted thereto but a combination of the wavelengths that is stored by the map data 18 may be any of the other combinations. The map data 18 may be a plurality of map data based on a combination of different wavelengths from each other. Accordingly, it increases the flexibility for the selection of a wavelength to be used for measuring a distance.

In the embodiment, reference is made to the map data 18 in order to calculate the object distance s from the shift amount D. However, the present invention is not restricted thereto but the object distance s may be calculated from the shift amount D by using an arithmetic expression. Accordingly, it is possible to reduce the storage area.

In the embodiment, the imaging plane 21*a* is disposed to expand perpendicularly to the advancing direction X1 of the incident light L. However, the present invention is not restricted thereto but the imaging plane 21*a* may be inclined with respect to the advancing direction X1 of the incident light L. For example, in a case in which the imaging distance f from the lens 20 to the imaging point is varied based on the wavelength of the light or the object distance s, the imaging plane 21*a* may be inclined in such a manner that the distance between the imaging plane 21*a* portion for picking up an image of the imaging point and the lens 20 is changed. Therefore, it is possible to enhance precision in the measurement of the distance that is to be carried out by the distance measuring apparatus.

In the embodiment, the imaging relative quantity is set to be the difference (the shift amount) between the imaging positions for two wavelengths. However, the present invention is not restricted thereto but the imaging relative quantity may be set to be a ratio of the imaging positions of the lights having the two wavelengths. This increases the flexibility for calculation of the imaging relative quantity in the imaging positions for the two wavelengths. Thus, it is possible to obtain a suitable result for the measurement.

In the embodiment, the object distance s is calculated based on a single shift amount. However, the present invention is not restricted thereto but the object distance s may be calculated based on a plurality of shift quantities including other shift quantities detected by a combination of other wavelengths. Based on the shift quantities, the object distance s is obtained with high precision. In particular, a spectrum sensor capable of detecting lights having a large number of wavelengths can detect imaging positions of images for a large number of wavelengths. In other words, it is possible to calculate a large number of shift quantities based on the difference between the imaging positions. Consequently, it is possible to easily measure a distance based on a large number of shift quantities, and furthermore, to enhance precision in the distance to be measured.

In the embodiment, there is described the case in which the lens 20 is a single convex lens. However, the present invention is not restricted thereto but it is sufficient that the lens 20 is an optical system for forming an image from incident light. Therefore, the lens 20 may be configured by a plurality of lenses. Moreover, the lens 20 may be configured to include a concave lens. The flexibility for the design of the lens is increased. Consequently, it increases the flexibility for the employment of the distance measuring apparatus.

In the embodiment, the main plane TX of the lens 20, that is, a central surface, which is a surface passing through a center in a vertical direction of the lens 20, has the inclination angle θa with respect to a perpendicular surface to the advancing direction X1 of the incident light L. However, the present invention is not restricted thereto but the central surface passing through the center in the vertical direction of the lens 20 may be set to be perpendicular to the advancing direction X1 of the incident light L if the optical axis AX of the lens 20 has a different orientation from the advancing direction X1 of the incident light L. In other words, in a case in which the optical axis AX of the lens 20 has an inclination with respect to the advancing direction X1 of the incident light L, the angle of the incident light is varied based on the object distance s. Accordingly, the imaging position, that is, the position of the imaging point is displaced in a horizontal direction or a vertical direction over a perpendicular surface to the advancing direction X1 of the incident light L. Therefore, an imaging relative quantity is generated so that the object distance s can be measured.

Figure 7:
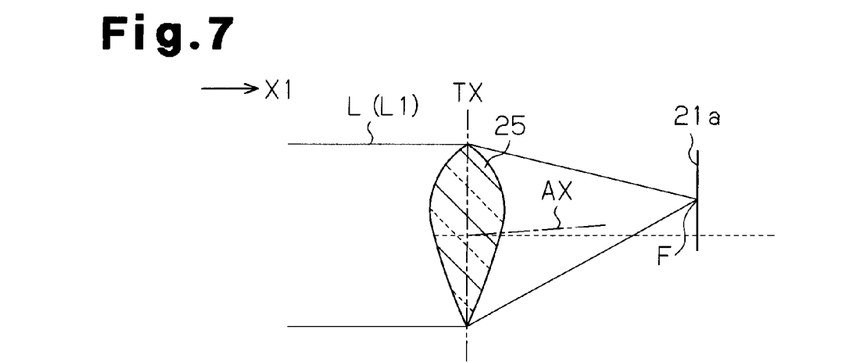
FIG. 7 is a schematic diagram showing the structure of an optical system of a spectrum measuring apparatus, which is a distance measuring apparatus according to another embodiment of the present invention.

As shown in FIG. 7, a surface of a lens 25, which is a convex lens, may be formed non-rotationally symmetrically. For example, the thickest portion of the lens 25 is inclined from a center of the lens 25. In FIG. 7, a maximum thickness of the lens 25 is inclined toward an upper part of the lens 25. For this reason, an optical axis AX is also inclined upward. In this case, the surface of the lens 25 is non-rotationally symmetrical with respect to the optical axis AX of the lens 25. In other words, the surface of the lens 25 may be made non-rotationally symmetrical with respect to the optical axis AX, thereby inclining the optical axis AX of the lens 25 to the advancing direction X1 of the incident light L. Also in this case, an imaging position is varied depending on the wavelength of the incident light L and the object distance s over the imaging plane 21a. Accordingly, it increases the flexibility for the design or structure of the distance measuring apparatus. A specific structure of the lens 25 in FIG. 7 may be changed.

Figure 8:
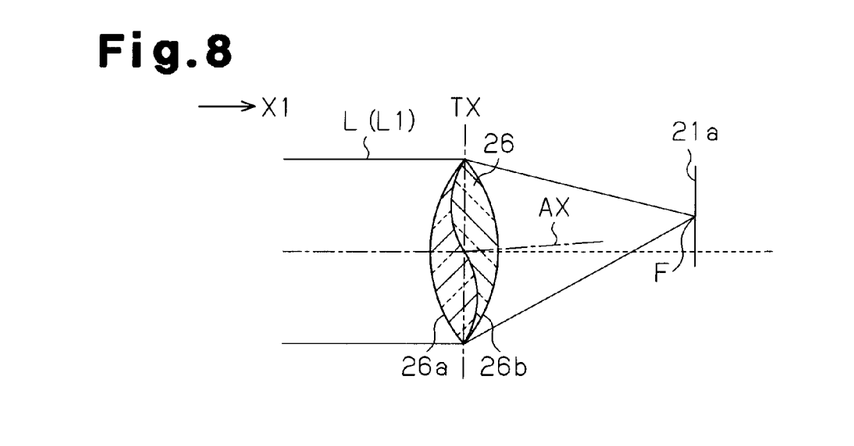
FIG. 8 is a schematic diagram showing the structure of an optical system of a spectrum measuring apparatus, which is a distance measuring apparatus according to a further embodiment of the present invention.

As shown in FIG. 8, a lens 26, which is a convex lens, may be configured by a first member 26a and a second member 26b, which have different refractive indices (aberrations) from each other to incline an optical axis AX of the lens 26 with respect to the advancing direction X1 of the incident light L. In FIG. 8, the first member 26a, which is close to the measuring target T, is concave in an upper part of the drawing and is convex in a lower part of the drawing with respect to the advancing direction X1 of the incident light L. The second member 26b is convex in the upper part of the drawing and is concave in the lower part of the drawing in order to fill in the concavo-convex portions of the first member 26a. Also in this case, the optical axis AX of the lens 26 is inclined upward. In other words, a refractive index of the lens 26 may be made non-rotationally symmetrical with respect to the optical axis AX to incline the optical axis AX of the lens 26 with respect to the advancing direction X1 of the incident light L. Also in this case, an imaging position is varied depending on the wavelength of the incident light L and the object distance s over the imaging plane 21a. Accordingly, it also increases the flexibility for the design or structure of the distance measuring apparatus. A specific structure of the lens 26 in FIG. 8 can be changed. Moreover, a single convex lens may be configured by three members or more.

The lens 25 in FIG. 7 or the lens 26 in FIG. 8 may be disposed in such a manner that a central surface (TX) passing through a center in a vertical direction is inclined with respect to the advancing direction X1 of the incident light L. Consequently, it increases the flexibility for the design or the structure of the distance measuring apparatus.

In the embodiment, there is described the case in which the lens 20 is not subjected to chromatic aberration correction. However, the present invention is not restricted thereto but the lens may be subjected to chromatic aberration correction if a wavelength to be used in a measurement of a distance is not subjected to chromatic aberration correction or the degree of correction is low. Also in an apparatus using a lens subjected to chromatic aberration correction, accordingly, it is possible to increase the possibility that the distance measuring apparatus can be employed.

In the embodiment, there is described a case in which the short and long wavelengths in the two wavelengths to obtain the shift amount D (the imaging relative quantity, which is a relative relationship quantity) are 400 nm and 800 nm, respectively. However, the present invention is not restricted thereto but two wavelengths to obtain the shift amount can be selected from visible and invisible light if they have such a relationship that chromatic aberration is caused by the lens 20. In other words, the short wavelength may be smaller or greater than 400 nm and the long wavelength may be smaller or greater than 800 nm. Accordingly, the flexibility for the selection of a wavelength in a distance measuring apparatus can be enhanced and a suitable combination of the wavelengths for a measurement of a distance can be selected so that the measurement of distance can also be carried out suitably. The invisible light may include ultraviolet rays (near ultraviolet rays) and infrared rays (containing far infrared rays, middle infrared rays and near infrared rays).

In the embodiment, there is described a case in which the shift amount D is reduced when the object distance s is increased. However, the present invention is not restricted thereto but it is sufficient that the shift amount D is varied depending on a change in the object distance s and may be increased when the distance is increased. In other words, the difference between the imaging positions (the shift amount) is variously changed depending on a relationship between the characteristic of the lens 20 and the selected wavelength. Therefore, it is sufficient to have such a relationship that the difference between the imaging positions (the shift amount) and the object distance s can be set as the map data 18. Under this condition, the difference between the imaging positions with respect to the object distance s may be varied in any way. Accordingly, it increases the flexibility for the selection of an optical system that can be employed for the distance measuring apparatus.

DESCRIPTION OF THE REFERENCE NUMERALS

10 . . . Vehicle, 11 . . . Spectrum Measuring Apparatus, 12 . . . Human Machine Interface, 13 . . . Vehicle Control Device, 14 . . . Spectrum Sensor, 15 . . . Spectral Data Processing Device, 16 . . . Computation Device, 17 . . . Storage Unit, 18 . . . Map Data, 20, 25, 26 . . . Lens, 21 . . . Detecting Device, 21a . . . Imaging Plane, 26a, 26b . . . Member, 30 . . . Noted Image Selecting Unit, 31 . . . Imaging Position Calculating Unit, 32 . . . Shift Amount Calculating Unit, 33 . . . Distance Calculating Unit, AX . . . Optical Axis, F, F11, F12, F21, F22, F31, F32 . . . imaging Point, P1 . . . Short Wave Image as Spectral Image, P2 . . . Long Wave Image as Spectral Image, PX1, PX2, PX3 . . . Noted Image, T, T1, T2, T3 . . . Measuring target, TX . . . Main Plane, T31, T32 . . . Image of Pedestrian, T21, T22 . . . Image of Other Vehicle, T11, T12 . . . Image of Tree.

The invention claimed is:

1. A distance measuring apparatus for measuring distance to a measuring target by optically detecting the measuring target, the apparatus comprising:
a lens, an optical axis of which has a different orientation from an advancing direction of light incident from the measuring target, the lens being configured to form an image from the incident light, thereby obtaining an image of the measuring target;
an imaging relative quantity calculator circuitry configured to calculate an imaging relative quantity by obtaining an imaging position indicative of the position of the image with respect to the lens for each of a plurality of wavelengths possessed by the incident light, the imaging relative quantity being a quantity indicative of a relative relationship between the imaging positions;
a storage configured to store correlation information, which is information determined by a chromatic aberration characteristic of the lens and the orientation of the optical axis in order to indicate a correlation between the imaging relative quantity and an object distance; and
a distance calculator circuitry configured to calculate the object distance by checking the imaging relative quantity against the correlation information,
the distance calculator circuitry is configured to measure the distance to the measuring target based on a relative relationship between the imaging positions for the respective wavelengths, wherein the light is refracted in a refractive index for each wavelength so that the imaging positions of the light are different from each other in a direction perpendicular to the advancing direction of the incident light for each wavelength, the object distance, which is the distance between the lens and the measuring target, is varied so that an incident angle of the light on the lens is made different, the object distance is varied so that an imaging position of light of a single wavelength is also changed,
the distance calculator circuitry is configured to obtain a difference between the imaging positions for the respective wavelengths based on the chromatic aberration by detecting the imaging positions for the respective wavelengths through a common lens by using light having a wavelength that is not subjected to the chromatic aberration correction for the measurement of the distance.

2. The distance measuring apparatus according to claim 1, wherein
the light has two wavelengths, in which the imaging positions are different from each other, and
the correlation information constitutes map data, in which the imaging relative quantities are caused to correspond to the object distances, respectively.

3. The distance measuring apparatus according to claim 2, wherein the imaging relative quantity is an imaging position difference, which is the difference between the imaging positions for the two wavelengths.

4. The distance measuring apparatus according to claim 2, wherein the imaging relative quantity is an imaging position ratio, which is the ratio of the imaging positions for the two wavelengths.

5. The distance measuring apparatus according to claim 1, wherein the optical axis of the lens is inclined with respect to the advancing direction of the incident light.

6. The distance measuring apparatus according to claim 1, wherein a surface of the lens is non-rotationally symmetrical with respect to the optical axis of the lens.

7. The distance measuring apparatus according to claim 1, wherein a refractive index of the lens is non-rotationally symmetrical with respect to the optical axis of the lens.

8. The distance measuring apparatus according to claim 1, wherein the lens is a part of a spectrum sensor for detecting light transmitted from the measuring target.

9. A distance measuring method using a distance measuring apparatus for measuring distance to a measuring target by optically detecting the measuring target, the method comprising:
forming an image of the measuring target by means of a lens of the distance measuring apparatus having an optical axis in a different orientation from an advancing direction of light incident from the measuring target;
obtaining an imaging position indicative of the position of the image with respect to the lens for each of a plurality of wavelengths possessed by the incident light;
using an imaging relative quantity calculator circuitry of the distance measuring apparatus, calculating an imaging relative quantity, which is a quantity indicative of a relative relationship between the imaging positions;
using a distance calculator circuitry of the distance measuring apparatus, calculating an object distance by checking the imaging relative quantity against correlation information, which is information determined by the imaging relative quantity, a chromatic aberration characteristic of the lens, and the orientation of the optical axis in order to indicate a correlation between the imaging relative quantity and the object distance;
using the distance calculator circuitry, measuring the distance to the measuring target based on a relative relationship between the imaging positions for the respective wavelengths, wherein the light is refracted in a refractive index for each wavelength so that the imaging positions of the light are different from each other in a direction perpendicular to the advancing direction of the incident light for each wavelength, the object distance, which is the distance between the lens and the measuring target, is varied so that an incident angle of the light on the lens is made different, the object distance is varied so that an imaging position of light of a single wavelength is also changed; and using the distance calculator circuitry, obtaining a difference between the imaging positions for the respective wavelengths based on the chromatic aberration by detecting the imaging positions for the respective wavelengths through a common lens by using light having a wavelength that is not subjected to the chromatic aberration correction for the measurement of the distance.

10. The distance measuring method according to claim 9, wherein the incident light has two wavelengths, the method further comprising:
- by obtaining an imaging position, obtaining the imaging position for each of the two wavelengths; and
- acquiring the correlation information from map data, which causes the imaging relative quantity to correspond to the object distance to calculate the object distance.

\* \* \* \* \*